(12) United States Patent
Veyrat et al.

(10) Patent No.: US 6,420,004 B1
(45) Date of Patent: Jul. 16, 2002

(54) COMPOSITE POLYESTER FILMS WITH BARRIER PROPERTIES

(75) Inventors: Didier Veyrat, Saint-Cyr-au-Mont-d'Or; Eric Maitre, Marcy-l'Etoile, both of (FR)

(73) Assignee: Toray Plastics Europe S.A. (FR)

( * ) Notice: Subject to any disclaimer, the term of this patent is extended or adjusted under 35 U.S.C. 154(b) by 0 days.

(21) Appl. No.: 09/423,094

(22) PCT Filed: Jul. 14, 1998

(86) PCT No.: PCT/EP98/04379
§ 371 (c)(1),
(2), (4) Date: Mar. 20, 2000

(87) PCT Pub. No.: WO99/03917
PCT Pub. Date: Jan. 28, 1999

(30) Foreign Application Priority Data

Jul. 17, 1997 (FR) .............................. 97 09314

(51) Int. Cl.⁷ .................. B32B 27/08; B32B 27/30; B32B 27/36
(52) U.S. Cl. ............... 428/36.6; 428/36.7; 428/141; 428/213; 428/215; 428/216; 428/336; 428/337; 428/339; 428/458; 428/461; 428/480; 428/483; 428/910; 525/56; 525/58; 525/60; 525/165; 525/167; 525/173; 525/174; 525/176
(58) Field of Search .................. 428/36.6, 36.7, 428/480, 141, 483; 478/213, 215, 216, 332, 334, 335, 336, 337, 457, 458, 461, 694.56, 910; 525/56, 58, 60, 165, 167, 173, 174, 176

(56) References Cited

U.S. PATENT DOCUMENTS

| | | | | |
|---|---|---|---|---|
| 4,824,725 A | * | 4/1989 | Thoese ..................... | 428/336 |
| 5,073,435 A | * | 12/1991 | Eyraud et al. ............ | 428/215 |
| 5,164,248 A | * | 11/1992 | Fleury et al. ............. | 428/220 |
| 5,658,676 A | * | 8/1997 | Prissette et al. ......... | 428/483 |
| 5,773,092 A | * | 6/1998 | Prissette et al. ......... | 427/385.5 |

* cited by examiner

Primary Examiner—Vivian Chen
(74) Attorney, Agent, or Firm—Harness, Dickey & Pierce, P.L.C.

(57) ABSTRACT

The invention concerns composite polyester films with good barrier properties relative to gases. More precisely, it concerns a biaxially drawn film, based on polyester and having improved barrier properties relative to gases, characterised in that it comprises a base polyester film of 5 to 50 μm, coated on one of its two surfaces with a deposit containing polyvinyl alcohol and a water dispersible copolyester with sulphonyloxy units, said composite film having permeability to oxygen measured at 23° C. under 50% relative humidity, not more than 5 cm³/m²/24 h. Said composite films have, besides being transparent and having barrier properties, excellent resistance to mechanical stresses, such as in particular crumpling.

39 Claims, No Drawings

COMPOSITE POLYESTER FILMS WITH BARRIER PROPERTIES

The present invention is concerned with composite films based on polyester and having good barrier properties against gases.

Polyester films, in particular polyethylene terephthalate, are largely used for packaging, owing to their numerous advantages, such as their mechanical properties, their transparency, their lack of toxicity, and because they have no taste or odour.

However, their properties as barriers for gases can limit their use in applications requiring a high level of protection for the packaged items, against the action of outside gases, in particular against the action of the oxygen of air, or conversely requiring that the gas composition within the packaging remains constant.

In order to overcome this drawback, it was proposed in GB-A-1 126 952 patent to deposit on a polymer film a solution of polyvinyl alcohol, in order to create a layer of polyvinyl alcohol, the latter having good gas-barrier properties. In order to enable a good adhesion of the polyvinyl alcohol layer on films of acetate cellulose, polycarbonate or polyethylene terephthalate, an intermediate layer of a polyurethane adhesive is provided between the film base and the polyvinyl alcohol layer.

Patent EP-A-0 254 468 also describes a composite film comprising a film base of a synthetic thermoplastic polymer, such as a polyamide, a polyethylene, a polypropylene or a polyester having two coatings on the same face of a film base; the first coating being adjacent to the film base and being comprised of a urethane primer applied in a solvent, which enables, when dry, a dispersion in an aqueous solution of a polyvinyl alcohol to wet the primer coating, the second coating being placed on the dried surface of the first coating and including a material based on a polyvinyl alcohol acting as a barrier to gases.

The present invention is concerned with polyester films having good barrier properties to gases, owing to a coating including a polyvinyl alcohol placed directly on the surface of the polyester film without the presence of an intermediate adhesive layer, while providing a good adhesion between the polyester film base and the coating.

More precisely, it is concerned with a composite film stretched biaxially, based on a polyester and having improved barrier properties to gases, characterised in that it includes a polyester film base of 6 $\mu$m to 50 $\mu$m, coated on one of its two faces with a layer including a polyvinyl alcohol which has an average degree of polymerisation in number equal to or in excess of 350 and which is hydrolysed to a degree of hydrolysis of 95% or more and a water-dispersible copolyester with sulphonyloxy residues, said composite film exhibiting a permeability to oxygen measured at 23° C. under a relative humidity of 50%, equal to or lesser than 5 cm$^3$/m$^2$/24 h.

A degree of hydrolysis (or degree of saponification) of 95% of the polyvinyl alcohol means that said polyvinyl alcohol includes 95% vinyl alcohol residues in its formula. The terms <<degree of hydrolysis>>, <<degree of saponification>> or <<content of polyvinyl alcohol residues>> will therefore be used interchangeably in the present specification.

The polyester forming the film base can be selected from those polyesters which are normally used for obtaining semi-crystalline bi-oriented films. These are film-forming linear polyesters, which crystallise when oriented and which are obtained in the usual manner from one or several aromatic dicarboxylic acids or their derivatives (for example, esters of lower aliphatic alcohols or halogenides) and from one or several aliphatic glycols. As examples of aromatic adds, one can mention phthalic acid, terephthalic acid, isophthalic acid, naphthalene 2,5-dicarboxylic acid and naphthalene 2,6-dicarboxylic acid. These acids can be associated to a minor amount of one or several aliphatic or cycloaliphatic dicarboxylic acids, such as adipic acid, azelaic acid and hexahydroterephthalic acid. As non limiting examples of aliphatic diols, one can mention ethylene glycol, 1,3-propanediol and 1,4-butanediol.

These diols can be associated with a minor amount of one or several aliphatic diols with a higher carbon content (neopentylglycol for example) or with cycloaliphatic diols (cyclohexanedimethanol). Preferably, the film-forming crystallisable polyesters are polyterephthalates or polynaphthalene dicarboxylates of alkylene diols and, in particular polyterephthalate of ethylene glycol (PET), of 1,4-butanediol or copolyesters thereof including at least 80% in moles ethylene glycol terephthalate residues. Advantageously, the polyester is a polyterephthalate of ethylene glycol having an intrinsic viscosity measured at 25° C. in ortho-chlorophenol comprised between 0.6 and 0.75 dl/g.

The polyester forming the film base must be selected in such a manner that its temperature at the beginning of the melting be higher than the temperature at which the bi-stretched film comprising the layer of the polyvinyl alcohol and of the water-dispersible copolyester is heated during its preparation.

When the thickness of the film including the polyvinyl alcohol and a water-soluble copolyester with sulphonyloxy residues is lesser than 0.6 $\mu$m, the average roughness Rz of the film base (such as defined in standard DIN 4768) is lesser than or equal to 0.40 $\mu$m on the face of the film carrying the layer of the polyvinyl alcohol and of the water-dispersible copolyester and this face exhibits, on the average, not more than 20 peaks having a height equal to or in excess of 1 micrometre and not more than 150 peaks having a height comprised between 0.4 and 1 micrometre, per square millimeter.

The peak height distribution mentioned above for defining the surface topography of the polyester film base, can be determined, in a known manner, and in particular through visual inspection with an interferential microscope which makes it possible to count the number of interference rings for a light having a known wavelength. The interferometers most frequently used are the NOMARSKI, the MIRAU and the MICHELSON interferometers.

Concerning the industrial implementation of these processes for the preparation of films according to the invention, in which the speed of the machine in which the films are processed is generally in excess of 100 meters per minute, it is particularly preferable that the face of the film base carrying the layer of polyvinyl alcohol and of the water-dispersible copolyester have no more than an average of 20 peaks having a height equal to or in excess of 1 micrometre and no more than 100 peaks having a height comprised between 0.4 and 1 micrometre, per square millimeter.

The water-dispersible copolyesters with sulphonyloxy residues combined with the polyvinyl alcohol in the coating are copolyester derived from at least one aromatic dicarboxylic acid and from at least one aliphatic diol, and carrying a plurality of sulphonyloxy groups of the general formula (I):

$$—(SO_3—)_nM \qquad (I)$$

in which n is equal to 1 or 2, M is a hydrogen atom, an alkali metal, an earth-alkali metal, a cationic ammonium or a cationic quaternary ammonium.

The term <<water-dispersible copolyester>> designates in the present application copolyesters which are soluble in water or copolyesters forming stable homogeneous dispersions.

The water-dispersible copolymers carrying sulphonyloxy residues are already known, in particular from patent FR 1 602 002 and from patent EP-A-0 540 374, to which one can refer for more detailed information on their preparation and their composition. They are obtained through the polycondensation of one or of several aromatic dicarboxylic acids with one or several aliphatic diols and at least one difunctional compound including at least one sulphonyloxy group of formula (I). For convenience sake, in the remainder of the specification, the term <(sulphonyloxy group>>designates both hydroxysulphonyl groups and alkali metal salts, alkaline-earth metal salts or ammonium salts derived therefrom.

Amongst the aromatic dicarboxylic acids used for preparing the water-dispersible copolyesters, one can mention, by way of example, terephthalic acid, isophthalic acid, orthophthalic acid and naphthalene 1,4-dicarboxylic acid. These acids can be used alone or as mixtures. Amongst the above-mentioned acids, one can use preferably, for the preparation of water-dispersible copolyesters entering into the composition of the films of the invention, terephthalic acid or isophthalic acid alone, mixtures thereof, or their mixtures with other aromatic dicarboxylic acids. Mixtures of terephthalic acid with one or several other aromatic dicarboxylic acids and specially with isophthalic acid, are particularly well-suited. In this case, the amount of terephthalic add, expressed in moles, can vary between 20 and 99% of the total number of moles of non sulphonated diacids and, preferably, between and 95%.

Concerning the preparation of the water-dispersible copolyester, aliphatic dicarboxylic acids including 3 to 15 atoms of carbon can be associated with the aromatic diacids. More particularly, a portion or the totality of the aromatic dicarboxylic acid used with the terephthalic acid, such as isophthalic acid, can be replaced by one or several aliphatic acids such as adipic acid, glutaric acid, succinic acid, suberic add, sebacic acid and dodecanoic acid.

As examples of diols entering into the composition of the water-dispersible copolyesters with sulphonyloxy groups, one can mention ethylene glycol, 1 ,4-butanediol, 1,5-butanediol, 1,3-propanediol, 1,2-propanediol, 2,2-dimethyl-1,3-pronanediol (or neopentylglycol), 1,5-pentanediol, 1,6-hexanediol, diethylene glycol, triethylene glycol, tetraethylene glycol and cyclohexane dimethanol. Ethylene glycol and its oligomers are particularly suitable. They can be used either alone or in mixtures thereof and/or with other diols. Preferably, residues derived from ethylene glycol and from its oligomers are present in the water-dispersible copolyesters.

The sulphonyloxy groups of the water-ispersible copolyesters are introduced via a difunctional compound carrying a sulphonyloxy group, capable of reacting with diols during the polycondensation. Examples of such compounds are cited in the patent EP-A 0 540 374. Preferably, the sulphonyloxy residues are derived from salts of alkali metals of aromatic dicarboxylic acids such as sulphoterephthalic acid, sulfoisophthalic acid, sulphophthalic acid, 4-sulphonaphthalene 2,7-dicarboxylic acid, sulpho4,4'-bis(hydroxycarbonyl)diphenylsulphones, sulphodiphenyidicarboxylic acid, 0o sulpho-4,4'-bis(hydroxycarbonyl) diphenylmethane, 5-sulphophenoxyisophthalic acid.

Water-dispersible copolyesters including sodium 5-oxysulphonylisophtalate residues are preferred.

In the water-dispersible copolyesters, the dicarboxylic acid residues with sulphonyloxy groups represent 5–30 moles per 100 moles of the dicarboxylic acid residues and, preferably 8–15 moles per 100 moles.

The coating of the polyvinyl alcohol and of the water-dispersible copolyester exhibits a weight ratio of the polyvinyl alcohol to the water-dispersible copolyester of 99/1 to 50/50. Preferably, this weight ratio of the polyvinyl alcohol to the water-dispersible copolyester is comprised between 97/3 and 80/20 and, even more preferably between 95/5 and 85/15.

The other face of the composite films according to the invention, the back face thereof, must exhibit slippage characteristics sufficient for enabling an easy handling of the film, in particular when stretching the same on guide rollers and when winding up of the same on uptake rollers. These slippage characteristics can be brought about in different manners.

One of the most usual methods consists in incorporating into the polyester, before its transformation into a film, solid inert fillers. These fillers are generally mineral fillers, such as for example silica, titanium oxide, zirconium oxide, alumina, mixtures of silica and alumina, silicates, calcium carbonate and barium sulphate. These fillers can also be comprised of particles of polymers.

The average diameter in volume of the fillers is generally comprised between 1 and 10 micrometres and, preferably, between 1 and 5 micrometres.

The filler content of the film is usually comprised between 0.02% and 1% weight relative to the weight of the polyester.

An interesting version of the invention consists in producing a polyester film base having surface properties, in particular roughness properties, which are different for each one of the two faces. This differing average roughness Rz can, for example, be higher than 0.15 micrometres on the back face of the film and be equal to or lesser than 0.40 micrometres on the face of the film base carrying the coating of the polyvinyl alcohol and of the water-dispersible copolyester.

Thus, the polyester film base can be formed of two layers having differing surface properties, in particular differing roughness properties.

Such dissymetrical films can be obtained using a co-extrusion technique of 2 polyesters having differing filler contents and, possibly fillers of differing nature. Advantageously, the polyester used is the same for the two co-extruded layers and the layer which is to receive the coating of polyvinyl alcohol and of the dispersible copolyester has a lower filler content. The relative thickness of the 2 polyester layers forming the polyester film base can vary broadly.

Generally, the layer which has the lower filler content and receiving coating of the polyvinyl alcohol and of the water-dispersible copolyester has a thickness equal to or in excess of 0.5 $\mu$m and, preferably equal to or in excess of 1.0 $\mu$m.

Film bases of polyester exhibiting differing surface properties on each one of the faces and obtained by other means known from prior art are nor excluded from the field of the invention.

One can thus confer, according to patent EP-A-0 378 954 good slippage characteristics to the back face of a film base by depositing on said back face a modified polymer obtained through a radical polymerisation in an aqueous phase of at least one acrylic monomer and of a polyester dispersible in water, derived from at least one aromatic dicarboxylic acid and from at least one aliphatic diol and including a plurality of sulphonyloxy groups, in particular of sodium sulphonate groups.

Depending on the coating process used, the coating of the polyvinyl alcohol and of the water-dispersible copolyester can have a thickness equal to or lesser than 3 μm. This thickness can be, if desired, lesser than 0.60 μm or even lesser than 0.20 μm, should one wish to facilitate the recycling of the film according to the invention. In practice however, only on rare occasions will the thickness be lesser than 0.05 μm.

An advantageous version of the composite films of the invention is concerned with films which carry a layer of polyvinyl alcohol on top of the coating of the polyvinyl alcohol and of the water-dispersible copolyester. This additional layer makes it possible to further decrease the permeability to gases of the composite films. By way of example, it can generally have a thickness of 0.1 μm to 10 μm.

The invention is also concerned with composite films such as those described previously, which furthermore carry a printed layer or a printed primer on one of their faces or a metal layer on the free face of the coating of the polyvinyl alcohol and of the water-dispersible copolyester or on the additional layer of polyvinyl alcohol, when provided.

The printed layer can be deposited by known printing methods such as gravure printing, flexographic printing, or serigraphy. Preferably, ink solutions or aqueous dispersions will be used.

The metal layer which is deposited on the surface of the coating of the polyvinyl alcohol and of the water-dispersible polyester which is not in contact with the polyester film or which is deposited on the free face of the additional layer of the polyvinyl alcohol is made of a metal which can be deposited using different known techniques. The metal is selected most often from aluminium, copper, chromium, nickel and silver. For practical and economical reasons, the metal used is preferably aluminium.

The thickness of the metal layer is generally between 0.01 μm and 0.06 μm. This thickness is determined by the measure of the optical density (measurements carried out with an apparatus MACBETH-TD102). These thicknesses correspond to optical densities of 1 to 3.6.

On the free face of the polyester film base, one can also apply a heat-sealable layer which can be of the polyolefin type (such as: radical polyethylenes, linear polyethylenes, metallocene polyethylenes, polypropylenes, ethylene - vinyl acetate copolymers, ionomer resins) and/or copolyesters. These complex films can be obtained by lamination using a single or a two component adhesive or by extrusion coating, by co-extrusion or by spread coating. This heat-sealable layer can function only as a sealable layer or have the double function of a sealable and of a peelable layer.

The complex films thus construed can be used for making packaging items, such as bags, membrane seals for trays, and secondary wrapping designed for packaging products sensitive to oxidation. They are particularly well adapted to packaging under a modified atmosphere. The present invention is also concerned with a process for the production of the above-described films.

More particularly, it concerns a process for the production of composite films based on a polyester film which includes on one of its faces a coating of a polyvinyl alcohol and of a water-dispersible polyester, said process being characterised in that the polyester film base is coated on one of its faces with an aqueous solution including a polyvinyl alcohol having at least 95% of vinyl alcohol residues, said polyvinyl alcohol having, in a 4% aqueous solution and at 20° C., a viscosity which is equal to or in excess of 4 mPa.s and a water-dispersible copolyester, the coating of the polyvinyl alcohol and of the water-dispersible polyester being in turn coated, if desired, with an aqueous solution of a polyvinyl alcohol, and in that said coated film is subjected to a thermal treatment at a temperature equal to or in excess of 170° C.

The thickness of the coating of the polyvinyl alcohol and of the water-dispersible polyester is preferably lesser than 3 micrometres.

The thickness of the additional layer of polyvinyl alcohol is, preferably, from 0.1 to 10 micrometres.

When it is desired to produce a coating of a polyvinyl alcohol and of a water-dispersible ester which has a thickness lesser than 0.6 micrometres, it is preferable that the face of the polyester film on which is applied the solution of the polyvinyl alcohol and of the water-dispersible co-polyester to produce a coating exhibit an average surface roughness Rz lesser than or equal to 0.40 μm and include on the average not more than 20 peaks having a height equal to or in excess of 1 micro-metre and not more than 150 peaks having a height comprised between 0.4 and 1 micrometre per square millimeter.

The coating of the polyester film base by the aqueous solution of the polyvinyl alcohol and of the water-dispersible copolyester can be carried out on-line or as a separate operation. When the coating operation is carried out on-line, the thickness of the coating is lesser and it is preferable to have a film surface topography which is more strictly defined.

In such a case, when the process according to the invention is implemented, for example in an industrial production using a high-speed equipment (generally running at more than 100 metres per minute), it is advantageous that the coating by the aqueous solution of the polyvinyl alcohol and of the water-dispersible copolyester be carried out on a face of the polyester film not carrying more than 20 peaks having a height equal to or in excess of 1 micrometre and not more than 100 peaks having a height comprised between 0.4 and 1 micrometre, per square millimeter.

When one carries out a coating operation as a separate step, the polyester film surface can be rougher than in the case of the on-line coating, without this however being a necessity.

Before the coating operation of the film base, the surface thereof is generally subjected to a physical treatment (such as a corona, flame or plasma treatment) designed for ensuring a good spreading of the polyvinyl alcohol layer on said film base. This treatment makes it possible to achieve a value for the surface tension of the film stretched monoaxially which is in excess of that of the coating of the polyvinyl alcohol and of the water-dispersible copolyester and which is preferably equal to or in excess of 54 mN.m.

The aqueous solution of the polyvinyl alcohol and of the water-dispersible copolyester used has generally a concentration of 1% to 20% in weight/weight and, preferably of 5% to 15% in weight 1 weight. Generally, in the first instance, a solution of polyvinyl alcohol is prepared. This solution is prepared carefully first at room temperature by simply stirring, then by heating to a temperature not exceeding 95° C; after cooling, the solution is filtered. This solution must be gel-ree. The absence of gel must be controlled by turbidity, dry matter content and refractive .index measurements. The water-dispersible copolyester is dissolved or dispersed in this solution of polyvinyl alcohol.

The weight ratio of the polyvinyl alcohol to the water dispersible copolyester in said aqueous solution is preferably from 99/1 to 50/50 and ranges preferably from 97/3 to 80/20 and even more preferably from 95/5 and 85/15.

The polyvinyl alcohol used in the process according to the invention is a compound available commercially. It can be used such as or prepared in particular by hydrolysis of vinyl carboxylates, more particularly vinyl polyacetates or their copolymers rich in vinyl acetate residues, such as the copolymers of vinyl acetate and ethylene (or EVA). As was mentioned previously, the polyvinyl alcohol used includes at least 95% vinyl alcohol residues (degree of hydrolysis equal to or in excess of 95%). Preferably, it includes at least 97% and even more preferably at least 98% thereof.

The polyvinyl alcohol used for the preparation of the composite coating of the polyvinyl alcohol and of the water-dispersible copolyester exhibits a viscosity in a 4% aqueous solution and at 20° C., measured in an apparatus of the Brookfield type, which is equal to or in excess of 4 centipoises (or 4 mPa.s), which corresponds, within experimental errors, to an average polymerisation degree in number equal to or in excess of 350.

The choice of the concentration of the solution of the polyvinyl alcohol and of the water-dispersible copolyester, as well as the apparatus used for the coating, is in particular, dependent on the desired thickness for the final coating of the polyvinyl alcohol and of the water-dispersible copolyester.

Coating operations are usually carried out with gravure rollers according to the reverse gravure technique. However, the process of the invention is not limited to this embodiment.

In the case of an on-line coating, the polyester film base is, the more often, stretched longitudinally (i. e. in the machine direction) before said coating by means of an aqueous solution of the polyvinyl alcohol and of the water-dispersible copolymer, without this version limiting the invention.

This stretching can be carried out in one or in several steps, which is also the case of the stretching which follows the coating.

The temperature at which the coated film is treated is preferably between 180° C. and 240° C. or, even more preferably, between 200° C. and 230 ° C.

The polyester film base can be prepared by extrusion of a polyester such as defined above, including one or several inert fillers to provide, in particular, sufficient slippage characteristics. It can also be prepared by co-extrusion, on the one hand of a polyester low in filler and, on the other hand, of a filled polyester.

In a second version, the polyester film base comprises a filled rough layer providing said back face and a less filled layer, providing said front face, which will be coated with the solution of the polyvinyl alcohol and of the water-dispersible copolyester.

The filled polyester layer generally exhibits an average roughness Rz which is equal to or in excess of 0.15 micrometres and, preferably equal to or in excess of 0.30 micrometres, whereas the less filled or non filled front layer exhibits a total roughness equal to or lesser than 0.40 micrometres and preferably, equal to or lesser than 0.25 micrometres ; as indicated previously, the face of the film base, which will be coated with the solution of the polyvinyl alcohol an of the water-dispersible copolyester, carries preferably, on the average, not more than 20 peaks having a height equal to or in excess of 1 micrometre and not more than 100 peaks having a height comprised between 0.4 and 1 micrometre per square millimeter.

The deposition of the metal coating is carried out by any known means. Preferably, use is made of a vacuum metallization technique.

The composite films of the invention exhibit excellent properties of resistance against mechanical aggression, such as in particular, crumpling or folding. This means that the barrier properties already discussed are little or not diminished after such a mechanical aggression.

The following examples illustrate the invention.

EXAMPLES

GENERAL EXPERIMENTAL PROCEDURE

A composite film is prepared from polyethylene terephthalate (PET) through the co-extrusion on the one hand of a PET containing 0.7% silica obtained by precipitation of gels and exhibiting an average diameter of 3.3 micrometres (size measurements carried out with a laser sizer <<SYMPATEC>> of the <<Helos>> type) which is the more filled film (back part of the composite film support) and, on the other hand, of a PET with a lower filler content (0.025% of the same silica) of which the outer face will receive a coating of a polyvinyl alcohol (PVA)/water-dispersible copolyester (COPO).

The polyester film has a thickness of 12 micrometres in the different examples or comparative tests and an average roughness Rz of 0.45 on the back face. It has a less filled layer (receiving the coating of the PVA and of the water-dispersible copolymer) which has a thickness of 11.2 micrometres.

The co-extruded film is first stretched longitudinally with stretch ratio of 3.4;

then the same is subjected to a corona treatment which adjusts it surface tension to 58 mN.m.

The face of the film with the less filled layer is then coated by means of a gravure coating system using an engraved roller. The speed of the film in the coating operation is of 200 m/min. The on-line coating (OLC) is carried out using an aqueous solution of PVA and of COPO having a 10% concentration, carefully prepared and devoid of gel. The PVA used has 98–99% vinyl alcohol residues and a,viscosity of 5.5 mPa.s (measured at 20° C. in a 4% aqueous solution by means of a viscosimeter of the Brookfield LV type). The COPO used is a copolyester of ethylene and diethylene having an average number molecular weight of about 33 000 and including terephthalate and isophthalate residues in a ratio of about 80/20 in weight, with 14% weight of sodium 5-oxysulfonyl-isophthalate in the total copolyester.

The coated film is then subjected to a transverse stretching with a stretch ratio of 4 and is then subjected to a thermal treatment at a temperature of 225° C. The thickness of the PVA/COPO layer is given for each example and for the Comparative tests.

In the examples or in the comparative tests describing films including two coatings, the coatings are applied on the bi-stretched film (longitudinal stretching with a stretch ratio of 3.4, followed by a transverse stretching with a stretch ratio of 4), in a separate coating operation (SCO).

On the different films dried at 200° C., measurements are made of the permeability to oxygen at 23° C. with 50% relative humidity (O2P) in $cm^3/m^2/24$ h) (measurements carried out using an <<OXTRAN>> apparatus, type 300H from the firm MODERN CONTROL INC.) and an adhesion test is carried out on the coating using the <<adhesive tape>> test, where an adhesive tape (3M N° 250) is applied on the coated film on which had been applied beforehand two layers of ink (TERCHEM 81), first a blue one and then a white one. Thereafter, a 4 kg roller is run over the sample, five times both ways, the tape is then peeled off by pulling manually along the axis of the sheet; the quality of the adhesion is evaluated from the amount of ink peeled away with the adhesive tape (score on a scale from 0 to 10: a score of 8 to 10 indicates an excellent adhesion of the coating onto the polyester film).

Examples 1 and 2

These tests are carried out with a composite polyester film of which the face receiving the coating of PVA/COPO exhibits the following peak height distribution, per mm$^2$: 7 peaks of a height >1 μm, 49 peaks of a height between 0.4 and 1 μm. The coating is carried out on-line (OLC) with aqueous solutions of PVA/COPO (the weight ratio PVA/COPO and the total concentration in the solution are given in table 1 hereafter).

Examples 3 and 4

The same composite polyester film was used in these examples 3 and 4. In these examples, after an on-line coating carried out with a solution of PVA/COPO, a separate coating was carried out with an aqueous solution of PVA only on the bi-stretched film, coated with PVA/COPO. The measurements are the same as in the other examples and the results are given in the table 1 hereafter.

Comparative Tests A, B and C

The same composite polyester film was used in these tests as in examples 1 and 2. In these tests, an on-line coating operation was carried out with an aqueous solution containing only COPO and then a separate coating operation was carried out on the bi-stretched film with an aqueous solution of PVA. Thus, a polyester film base was obtained carrying two successive coatings, the first one consisting of a water-dispersible copolyester and the second one of a polyvinyl alcohol. The measurements were the same as those carried out in the other examples and the results are given in table 1 hereafter.

Comparative Test D

This test was done on the same composite film as in examples 1 and 2. In this test, an on-line coating was carried out with an aqueous solution containing only PVA. The measurements were the same as in the examples and the results are given in table 1 hereafter.

In table 1 hereafter, the following abbreviations are used, in addition to the abbreviations defined previously:

<<Ex>> stands for <<example>>
<<CT>> stands for <<comparative test>>
<<Ad. test>> stands for o adhesion test>>
<<Concsol w 1 w>> stands for (total concentration of the aqueous solution in weight>>
<<Thick>> stands for <<thickness>>

TABLE 1

| | OLC | | | | SCO | | | |
|---|---|---|---|---|---|---|---|---|
| Test | PVA/COPO | Concsol w/w | Thick, μm | PVA | Concsol w/w | Thick, μm | O2P | Ad. test |
| Ex. 1 | 90/10 | 10% | 0.2 | none | none | none | 1.0 | 1.0 |
| Ex. 2 | 99/01 | 10% | 0.2 | none | none | none | 1.0 | 8.5 |
| Ex. 3 | 90/10 | 10% | 0.2 | present | 2.5% | 2.5 | 0.6 | 9 |
| Ex. 4 | 90/10 | 10% | 0.2 | present | 10% | 6 | 0.1 | 9 |

TABLE 1-continued

| | OLC | | | | SCO | | | |
|---|---|---|---|---|---|---|---|---|
| Test | PVA/COPO | Concsol w/w | Thick, μm | PVA | Concsol w/w | Thick, μm | O2P | Ad. test |
| CT a | 0/100 | 2.5% | 0.02 | present | 8% | 0.41 | 15 | 2 |
| CT b | 0/100 | 5% | 0.04 | present | 2% | 0.07 | 14.6 | 5 |
| CT c | 0/100 | 5% | 0.04 | present | 9% | 0.34 | 7.4 | 5 |
| CT d | 100/0 | 12% | 0.1 | present | none | — | 2.6 | 5 |

Example 5 and Comparative Test E

The same polyester composite film was used in these tests as in examples 1 and 2. In these tests, an on-line coating was carried out using an aqueous solution of PVA/COPO (example 5) or an aqueous solution of PVA only (comparative test e), with a total concentration of 12% in the solution. The weight ratio of PVA 1 COPO was of 90/10 and the PVA had a saponification degree of 98%.

These films were metallized by deposition of an aluminum layer of 0.035 μm.

The O2P of the metallized films was measured under the conditions indicated for the preceding examples.

Each one of the two metallized films was laminated with a polyethylene film (of 50 μm) using a polyurethane adhesive and an adhesion test was carried out.

This test consists in applying on the film a pulling force with an INSTRON 1122 apparatus, at the speed of 100 mm/min. The peeling strength thus measured is expressed in grams per 15 millimeters. A peeling strength of 150 g/15 mm is considered as satisfactory for commercially sold metallized films. The results of these tests are given in table 2 hereafter.

TABLE 2

| Test | PVA/COPO | O2P | Peeling strength, g/15 mm |
|---|---|---|---|
| Example 5 | 90/10 | 0.1 | 220 |
| Comparative example e | 100/0 | 0.2 | 105 |

Example 6 and Comparative Test F

In these tests, the same polyester composite film as in examples 1 and 2 was used. The coating was carried out on-line with an aqueous solution of PVA 1 COPO (example 6) or with an aqueous solution of PVA only (comparative test), with a total concentration of 12% in the solution. The weight ratio PVA/COPO was of 90/10 and the PVA had a saponification degree of 98%.

The O2P of these films was measured under the conditions defined for the previous examples.

Each one of the two films was laminated on a polyethylene film (of 50 μm) by means of a polyurethane adhesive and an adhesion test was carried out as described in example 5 and in the comparative test e.

A peeling strength of 250 g/15 mm is considered as satisfactory for commercially sold non metallized films. The results of these tests are given in table 3 hereafter.

TABLE 3

| Test | PVA/COPO | O2P | Peeling strength, g/15 mm |
| --- | --- | --- | --- |
| Example 6 | 90/10 | 0.1 | 320 |
| Comparative test f | 100/0 | 2.6 | 200 |

What is claimed is:

1. A composite film stretched biaxially, and having barrier properties to gases, comprising a polyester film base of 5/m to 50 μm, coated on one of its two faces with a layer including a polyvinyl alcohol which has a number average degree of polymerization equal to or greater than 350 and a degree of hydrolysis equal to or greater than 95% and a water-dispersible copolyester with sulphonyloxy residues, said composite film exhibiting a permeability to oxygen measured at 23° C. under a relative humidity of 50% equal to or less than 5 cm³/m²/24 h.

2. A film according to claim 1, wherein the polyester is selected from polyterephthalates or from polynaphthalene dicarboxylates of alkylene diols.

3. A film according to claim 2, wherein the polyester is selected from polyterephthalates of ethylene glycol or of 1,4-butanediol and the copolyesters including at least 80% in moles of ethylene glycol terephthalate residues.

4. A film according to one of claims 1 to 3, wherein the average roughness Rz of the film base is less than or equal to 0.40 μm on the face of the film carrying the layer of the polyvinyl alcohol and of the water-dispersible copolyester and this face exhibits, on the average, not more than 20 peaks having a height equal to or greater than 1 μm and not more than 150 peaks having a height between 0.4 and 1 micrometre per square millimeter, when the thickness of the layer including the polyvinyl alcohol and the water-soluble copolyester with sulphonyloxy residues is less than 0.6 μm.

5. A film according to one of claims 1 to 3, wherein the face of the film base carrying the layer of the polyvinyl alcohol and of the water-dispersible copolyester has no more than an average of 20 peaks having a height equal to or greater than 1 micrometre and no more than 100 peaks having a height between 0.4 and 1 micrometre, per square millimeter.

6. A film according to one of claims 1 to 3 wherein the water-dispersible copolyester with sulphonyloxy residues combined with the polyvinyl alcohol in the coating is selected from copolyesters derived from at least one aromatic dicarboxylic acid and from at least one aliphatic diol, and carrying a plurality of sulphonyloxy groups of the formula (I):

—(SO₃—)ₙM        (I)

in which n is equal to 1 or 2, M is a hydrogen atom, an alkali metal, an earth-alkali metal, a cationic ammonium or a cationic quaternary ammonium.

7. A film according to claim 6, wherein the aromatic dicarboxylic acid used for preparing the water-dispersible copolyester is selected from terephthalic acid, isophtalic acid, orthophthalic acid, naphthalene 1,4-dicarboxylic acid and their mixtures.

8. A film according to claim 7, wherein the aromatic dicarboxylic acid is selected from mixtures of terephthalic acid with one or more other aromatic dicarboxylic acids.

9. A film according to claim 8, wherein the aromatic dicarboxylic acid is selected from mixtures of terephthalic acid with isophtalic acid.

10. A film according to claim 8, wherein the amount of terephthalic acid expressed in moles is in the range from 20 to 99% of the total number of moles of non sulphonated diacids and in that the water-dispersible copolyester includes sodium 5-oxysulphonyl-isophthalate residues.

11. A film according to claim 10, wherein the amount of terephthalic acid expressed in moles is in the range from 30 to 95%.

12. A film according to claim 6, wherein the diol entering into the composition of the water-dispersible copolyester with sulphonyloxy groups, is selected from ethylene glycol, 1,4-butanediol, 1,5-butanediol, 1,3-propanediol, 1,2-propanediol, 2,2-dimethyl-1,3pronanediol (or neopentylglycol), 1,5-pentanediol, 1,6-hexanediol, diethylene glycol, triethylene glycol, tetraethylene glycol and cyclohexane dimethanol.

13. A film according to claim 12, wherein the diol entering into the composition of the water-dispersible copolyester with sulphonyloxy groups, is selected from ethylene glycol and its oligomers.

14. A film according to claim 6, wherein in the water-dispersible copolyester, the dicarboxylic acid residues with sulphonyloxy groups amount to 5–30 moles for 100 moles of the dicarboxylic acid residues.

15. A film according to claim 14, wherein in the water-dispersible copolyester, the dicarboxylic acid residues with sulphonyloxy groups amount to 8–15 moles for 100 moles of the dicarboxylic acid residues.

16. A film according to one of claims 1 to 3, wherein the coating of the polyvinyl alcohol and of the water-dispersible copolyester exhibits a weight ratio of the polyvinyl alcohol to the water-dispersible copolyester of 99/1 to 50/50.

17. A film according to claim 16, wherein the coating of the polyvinyl alcohol and of the water-dispersible copolyester exhibits a weight ratio of the polyvinyl alcohol to the water-dispersible copolyester comprised between 97/3 and 80/20.

18. A film according to one of claims 1 to 3, wherein the coating of the polyvinyl alcohol and of the water-dispersible copolyester has a thickness equal to or lesser than 3 μm.

19. A film according to one of claims 1 to 3, wherein said composite film further carries on the coating of the polyvinyl alcohol and of the water-dispersible copolyester, a layer of polyvinyl alcohol.

20. A film according to claim 19, wherein said composite film further carries a printed layer or a printed primer on one of its faces, or in that it further carries a metal layer on the additional layer of the polyvinyl alcohol.

21. A film according to claim 20, wherein the metal layer, which is deposited on the surface of the coating of the polyvinyl alcohol and of the water-dispersible polyester not in contact with the polyester film or which is deposited on the additional layer of the polyvinyl alcohol, is made of a metal selected from aluminum, copper, chromium, nickel and silver.

22. A film according to claim 21, wherein the metal layer, which is deposited on the surface of the coating of the polyvinyl alcohol and of the water-dispersible polyester not in contact with the polyester film or which is deposited on the additional layer of the polyvinyl alcohol, is made of aluminum.

23. A film according to claim 21, wherein the thickness of the metal layer is in the range from 0.01 μm to 0.6 μm.

24. A film according to one of claims 1 to 3, wherein the polyester base film is comprised of two layers exhibiting different roughnesses Rz.

25. A film according to claim 24, wherein the polyester base film comprised of two layers exhibiting different roughnesses is produced with a technique of co-extrusion of 2 polyesters having different filler contents and selectively including different fillers.

26. A film according to claim 25, wherein the polyester used is the same for the two co-extruded layers and in that the layer receiving the polyvinyl alcohol and water-dispersible copolyester layer is the less filled one.

27. A process for the production of composite films according to one of claims 1 to 3, wherein the polyester base film is coated, on one of its faces, by means of an aqueous solution including a polyvinyl alcohol exhibiting at least 95% of alcohol residues, said polyvinyl alcohol exhibiting in an aqueous 4% solution and at 20° C. a viscosity equal to or greater than 4 mPa.s and a water-dispersible copolyester and in that said coated film is treated thermally at a temperature equal to or greater than 170° C.

28. A process according to claim 27, wherein the face of the polyester film carrying the coating of the polyvinyl alcohol and the water-dispersible copolyester exhibits, an average roughness Rz less than or equal to 0.40 µm and does not carry on the average more than 20 peaks having a height equal to or greater than 1 micrometre and not more than 150 peaks having a height between 0.4 and 1 micrometre per square millimeter, when the desired thickness of the coating including the polyvinyl alcohol and the water-dispersible copolyester is less than 0.6 micrometres.

29. A process according to claim 27, wherein the coating of the polyester film base with an aqueous solution of the polyvinyl alcohol and of the water-dispersible copolyester is carried out on line or as a separate operation.

30. A process according to claim 29, wherein the coating is carried out on-line.

31. A process according to claim 27, wherein the aqueous solution of the polyvinyl alcohol and of the water-dispersible copolyester is used at a concentration in the range from 1% to 20% in weight.

32. A process according to claim 31, wherein the aqueous solution of the polyvinyl alcohol and of the water-dispersible copolyester is used at a concentration in the range from 5% to 15% in weight.

33. A process according to claim 27, wherein the weight ratio of the polyvinyl alcohol to the water dispersible copolyester in the aqueous solution is between 99/1 and 50/50.

34. A process according to claim 33, wherein the weight ratio of the polyvinyl alcohol to the water-dispersible copolyester in the aqueous solution is between 97/3 and 80/20.

35. A process according to claim 27, wherein the polyvinyl alcohol used includes at least 97% of vinyl alcohol residues.

36. A process according to claim 35, wherein the polyvinyl alcohol used includes at least 98% of vinyl alcohol residues.

37. A process according to claim 27, wherein the temperature at which the coated film is treated, is between 180° C. and 240° C.

38. A process according to claim 37, wherein the temperature at which the coated film is treated, is between 200° C. and 230° C.

39. A film according to one of claims 1 or 3 wherein said composite film further carries a printed layer or a printed primer on one of its faces, or in that it further carries a metal layer on the coating of the polyvinyl alcohol and of the water-dispersible copolyester.

* * * * *

UNITED STATES PATENT AND TRADEMARK OFFICE
CERTIFICATE OF CORRECTION

PATENT NO. : 6,420,004 B1
DATED : July 16, 2002
INVENTOR(S) : Didier Veyrat and Eric Maitre It is certified that error appears in the above-identified patent and that said Letters Patent is hereby corrected as shown below:

Column 1,
Line 47, "6$\mu$m" should be -- 5$\mu$m --

Column 2,
Line 4, "adds" should be -- acids --

Column 3,
Line 33, "add" should be -- acid --
Line 35, after "between" insert -- 30 --
Line 56, "ispersible" should be -- dispersible --
Line 66, delete "0o"

Column 4,
Line 50, before "dispersible" insert -- water- --
Line 60, delete "nor" and substitute -- not -- therefor Column 6,
Line 57, "weight 1 weight" should be -- weight/weight --
Line 62, "gel-ree" should be -- gel-free --

Column 7,
Line 31, delete "the"

Column 8,
Line 51, "Comparative" should be -- comparative --

Column 9,
Line 63, Example 1 Ad. test 1.0" should be -- Ad. test 10 --

Column 10,
Line 52, "PVA 1 COPO" should be -- PVA/COPO --

UNITED STATES PATENT AND TRADEMARK OFFICE
CERTIFICATE OF CORRECTION

PATENT NO. : 6,420,004 B1
DATED : July 16, 2002
INVENTOR(S) : Didier Veyrat and Eric Maitre It is certified that error appears in the above-identified patent and that said Letters Patent is hereby corrected as shown below:

Column 11,
Line 10, "5/m" should be -- $5\mu m$ --

Column 12,
Line 38, "5/m" should be -- $5\mu m$ --
Line 38, "lesser" should be -- less --

Column 14,
Line 27, "or" should be -- to --

Signed and Sealed this

Twenty-first Day of January, 2003

JAMES E. ROGAN
*Director of the United States Patent and Trademark Office*